UNITED STATES PATENT OFFICE.

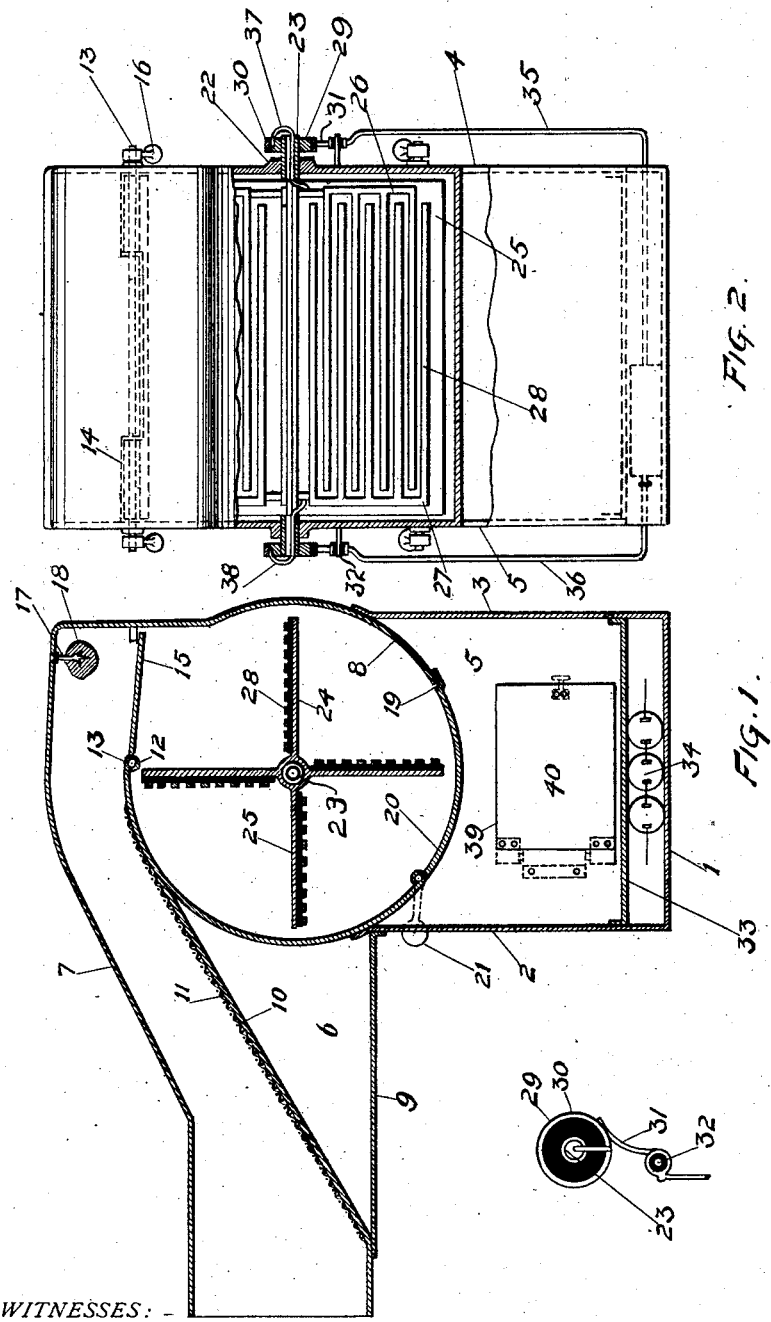

ADOLF MORAWSKI, OF TARIFFVILLE, CONNECTICUT.

ELECTRIC RAT-TRAP.

1,047,682.  Specification of Letters Patent.  Patented Dec. 17, 1912.

Application filed April 6, 1912. Serial No. 689,022.

*To all whom it may concern:*

Be it known that I, ADOLF MORAWSKI, a subject of the Czar of Russia, residing at Tariffville, in the county of Hartford and State of Connecticut, have invented certain new and useful Improvements in Electric Rat-Traps, of which the following is a specification, reference being had therein to the accompanying drawing.

This invention relates to an electric rat trap, and the objects of my invention are to provide a trap that can be advantageously used in warehouses and large buildings for catching rats and other rodents, and to furnish a trap with positive and reliable means, in a manner as will be hereinafter set forth, for exterminating the rats, as they are caught, by electricity.

Further objects of the invention are to provide a rat trap which will house the bodies of the rats, and to provide a trap of the above type that can be safely handled and manufactured at a comparatively small cost.

I attain the above objects by a mechanical construction that will be hereinafter specifically described and then claimed, and reference will now be had to the drawing, wherein:—

Figure 1 is a vertical longitudinal sectional view of the trap, Fig. 2 is an end view of the same partly broken away and partly in section, and Fig. 3 is a detailed view of a commutator and brush adapted to form part of the trap.

A trap in accordance with this invention consists of a casing in which is located a gang-plank leading to a trap-door and the trap-door is adapted to deposit a rat upon a rotary conveyer, the conveyer being charged with electricity to exterminate the life of a rodent immediately upon contacting with the same. From the conveyer the rodent's body is deposited in the bottom of the casing and can be easily removed.

The casing comprises a bottom 1, a front wall 2, a rear wall 3, and side walls 4 and 5. The side walls 4 and 5 are of a greater height than the front and rear walls and are provided with forward extensions 6, these extensions having the upper edges thereof connected by a roof plate 7 that is bent downwardly and curved in proximity to the upper edge of the rear wall 3 to form a cylinder 8, the end of said plate terminating at a point in the upper part of the casing. The lower edges of the extensions 6 are connected by a bottom plate 9 and this bottom plate supports a gangway 10 between the extensions 6, said gangway extending from the forward edge of the bottom plate 9 upwardly to the upper edge of the cylinder 8. In order that a rodent can easily crawl up the gangway, said gangway is covered with wire gauze 11 to provide a foothold.

The upper edge of the cylinder 8 is provided with a barrel 12 for a pin 13 that extends through the walls 4 and 5 of the casing. Mounted upon the pin within the casing are the barrels 14 of a trap door 15, said door extending in proximity to the rear wall of the casing. The outer ends of the pins 13 are provided with weighted arms 16 for normally maintaining the trap door 15 in a horizontal position. To attract a rodent on to the trap door 15, the roof plate 7 above said trap door has a depending bait holder 17 for a bait 18. The bottom of the cylinder 8 has an opening 19 normally closed by a curved drop door 20 and this door is mounted similar to the door 15, that is, with weighted arms 21 normally supporting the door in a closed position.

The side walls 4 and 5 of the casing are provided with diametrically opposed bosses 22 and journaled in said bosses is a tubular shaft 23. Carried by the shaft 23 is a plurality of radially disposed blades 24. Arranged upon each blade is a plate of insulation and contact bars 26 and 27, these bars having lateral extensions 28 alternately arranged in parallelism. Mounted upon the outer ends of the tubular shaft 23 are disks 29 made of wood or other insulation and mounted upon said disks are rings 30. Contacting with the rings 30 are brushes 31 carried by brush holders 32 secured to the outer sides of the walls 4 and 5.

The casing is provided with a false bottom 33 and located upon the bottom plate 1 beneath the false bottom 33 are battery cells 34. These battery cells are connected by wires 35 and 36 to the brushes 31 and the rings 30 are connected by wires 37 and 38 to the contact bars 26 and 27 of the rotary conveyer. The side wall 5 has an opening 39 above the false bottom 33 adapted to be closed by a hinged door 40. It is through the medium of the opening 39 that the dead bodies of rats can be removed from the casing. The contact bars 26 and 27 and the extensions thereof are normally charged with electricity and when the extensions 28 of said bars are connected by the body of a rat falling above the rotary conveyer the rat's body immediately completes a circuit and is electrocuted. The weight of the body causes the conveyer to revolve and the drop door 20 discharges the body into the lower part of the casing. The drop door 20 immediately closes and prevents another rat from detecting the presence of the dead rat's body in the lower part of the casing.

What I claim is:—

In a trap, a casing having a cylindrical portion, a rotatable conveyer mounted in said cylindrical portion and having radially disposed blades, a trap-door in said cylindrical portion above the conveyer, a gang way in said casing and leading to said trap-door, a source of electrical energy, contact bars carried by said conveyer blades and arranged in groups so connected as to be of opposite polarity, the groups being insulated from each other, and means for connecting the contact bars to said source of electrical energy, the electrocuted rodent discharging through said cylindrical portion below the conveyer.

In testimony whereof I affix my signature in the presence of two witnesses.

ADOLF MORAWSKI.

Witnesses:
 JOSEPH GOLDIN,
 M. FINKELSTEIN.

Copies of this patent may be obtained for five cents each, by addressing the "Commissioner of Patents, Washington, D. C."